(12) United States Patent
Harling et al.

(10) Patent No.: US 6,222,454 B1
(45) Date of Patent: Apr. 24, 2001

(54) NON-CONTACTING TEMPERATURE SENSING DEVICE

(75) Inventors: Gord Harling, Bromont; Rose Zhang, Sainte-Foy; Tim Pope, Quebec; Francis Picard, Sainte-Foy; Abdellah Azelmad, Montreal, all of (CA)

(73) Assignee: Goal Electronics Inc., Montreal (CA)

( * ) Notice: Subject to any disclaimer, the term of this patent is extended or adjusted under 35 U.S.C. 154(b) by 0 days.

(21) Appl. No.: 09/340,506

(22) Filed: Jul. 1, 1999

(51) Int. Cl.$^7$ .................................................. G08B 17/00
(52) U.S. Cl. ......................... 340/584; 340/580; 340/581; 340/962; 250/339.04; 250/341.8
(58) Field of Search ..................................... 340/584, 583, 340/905, 580, 581, 962; 250/339.04, 340, 341, 338.1, 339.01, 339.02; 356/51, 448

(56) References Cited

U.S. PATENT DOCUMENTS

| | | |
|---|---|---|
| 3,596,264 | 7/1971 | Ciemochowski . |
| 3,654,809 | 4/1972 | Worden et al. ..................... 73/355 R |
| 3,795,918 | 3/1974 | Sunderland ............................ 356/45 |
| 3,891,979 | 6/1975 | Braun et al. . |
| 3,922,550 | 11/1975 | Crowley et al. ..................... 250/338 |
| 4,222,044 | 9/1980 | Boschung ............................ 340/581 |
| 4,274,091 | 6/1981 | Decker ................................. 340/583 |
| 4,364,294 | 12/1982 | Christol et al. ...................... 374/170 |
| 4,492,952 | 1/1985 | Miller . |
| 4,690,553 | * 9/1987 | Fukamizu et al. ...................... 356/51 |
| 4,708,493 | * 11/1987 | Stein .................................... 374/128 |
| 4,924,478 | 5/1990 | Tank .................................... 374/121 |
| 5,021,980 | 6/1991 | Poenisch et al. ..................... 364/557 |
| 5,132,922 | 7/1992 | Khan et al. ........................... 364/557 |
| 5,218,206 | * 6/1993 | Schmitt et al. ....................... 250/339 |
| 5,416,476 | 5/1995 | Rendon ................................ 340/905 |
| 5,521,123 | * 5/1996 | Komatsu et al. ..................... 437/209 |
| 5,550,373 | * 8/1996 | Cole et al. ......................... 250/338.1 |
| 5,554,849 | * 9/1996 | Gates .............................. 250/370.08 |
| 5,640,013 | * 6/1997 | Ishikawa et al. ................. 250/338.4 |
| 5,688,699 | * 11/1997 | Cunningham et al. .................. 437/3 |
| 5,745,051 | * 4/1998 | Doherty et al. ...................... 340/905 |
| 5,774,070 | 6/1998 | Rendon ................................ 340/905 |
| 5,796,344 | * 8/1998 | Mann et al. .......................... 340/583 |
| 5,822,222 | 10/1998 | Kaplinsky et al. ................... 364/557 |
| 5,895,233 | * 4/1999 | Higashi et al. ....................... 438/107 |
| 6,002,132 | * 12/1999 | Mooney et al. ................... 250/338.4 |

FOREIGN PATENT DOCUMENTS 0798545   10/1997  (EP) .

* cited by examiner

*Primary Examiner*—Daniel J. Wu
*Assistant Examiner*—Toan Pham
(74) *Attorney, Agent, or Firm*—McDermott, Will & Emery (57) ABSTRACT

The device according to the invention provides a non-contacting temperature sensing device incorporating micro-bolometric detectors as the suitable infrared sensors for automotive applications. A first and second infrared sensors each include an active infrared sensing element and a temperature drift compensating element. A current bias is applied to the active infrared sensing element as well as to the temperature drift compensating element, which is identical in structure with the active infrared sensing element, and the voltage outputs of these two elements pass through a differential amplifier. The fluctuation in the substrate temperature or the ambient temperature affects the active sensing element and the compensating element in the same way, thus it is cancelled out. Instead of using one spectral band of the infrared radiation, as in the prior art, two spectral bands are used resulting in a first and second signal generated by the first and second infrared sensors. A ratio of the first and second signals is obtained. The ratio of the signals is emissivity independent, so that the device of the present invention provides a more accurate measurement of temperature. The need to compensate for window contamination is also eliminated by this two band approach. The filtering elements for the two bands can be multi-layer thin film filters either coated on flat windows or on diffractive micro-lenses. The use of diffractive micro-lenses further reduces the size of the device, and eliminates the need for a separate optical lens.

13 Claims, 6 Drawing Sheets

NON-CONTACTING TEMPERATURE SENSING DEVICE

FIELD OF THE INVENTION

The present invention relates to a device for the non-contacting temperature measurement of a surface, for example, the surface of a roadway, from a moving vehicle, using an emissivity independent infrared radiation detection method and infrared detectors, although the invention is not limited in scope to automotive applications.

DESCRIPTION OF THE PRIOR ART

One important aspect of automobile related inventions is to improve the safety features. It has been found desirable to be able to remotely measure the road surface temperature from a moving vehicle in an accurate way, either for predicting the likelihood of icing formation or for warning of overheated surface. Earlier road condition monitoring systems used ordinary thermistors to measure the ambient temperature close to road surface as an approximation for the actual surface temperature. Essentially, these systems include a temperature sensing means for measuring the temperature and means for providing a warning if the measured temperature falls within a range indicative of ice-forming conditions.

Infrared sensors have long been used for remote measurement of temperature of a surface based on the fact that when the infrared radiation associated with the temperature of the object impinges on and heats an infrared sensor, it induces a change in the sensor output proportional to the infrared radiation the sensor receives. However, most of such applications are for relatively high temperature measurements (>100° C.). In the case of surfaces with temperatures near or below room temperature, for example, the road surface temperature in winter, the infrared radiation therefrom impinging on the infrared sensor is very weak. Therefore, not all types of infrared sensors are suitable for such applications.

U.S. Pat. No. 5,416,476 by Rendon proposes using infrared detectors as the temperature sensing means in order to detect potentially icy conditions on roads. This patent describes a system and method for detecting potentially icy conditions on roads with an infrared detector mounted externally of a vehicle and aimed at a road surface. The detector is arranged to read only the infrared temperature wavelength emissions associated with concrete and asphalt to eliminate erroneous readings inadvertently received through infrared emissions of other objects located in the vicinity of the detector. The detector is connected to a processing unit which translates the electrical signals from the detector into a temperature readout display. However, this patent does not state or suggest which type of infrared detectors are suitable candidates.

U.S. Pat. No. 5,796,344 by Mann, et al. further elaborated the signal processing aspect of such systems with consideration for compensation of window contamination from road dust and spray, since the infrared detectors are usually housed in a casing provided with a window. Due to various factors, the window tends to become contaminated with dust, water, spray, etc., while the vehicle is in motion.

These two patents have considered neither the impact of the emissivity variation on the accuracy of the temperature measurement, nor the compensation for the detector substrate and background temperature drift due to the normal operation of a vehicle.

The infrared detector types mentioned by Mann et al. are thermopile or pyroelectric type infrared sensors. Thermopile detectors are known to have long thermal time constant, thus can not respond to fast changes in temperature. Pyroelectric type detectors are intrinsically sensitive to mechanical vibration and shocks, thus are not suitable in a vibrating environment such as on-board a moving vehicle. Pyroelectric type detectors also need a chopper to modulate the incident radiation, complicating the system.

The amount of infrared radiation received by the detector depends on the temperature and the emissivity of the radiating surface. Earlier road temperature measuring devices using infrared detection, represented by Rendon and Mann, et al., detect the infrared radiation within one wavelength band and calculate the temperature based on the assumption that the emissivity of the road surface is a constant value. However, this is a very rough approximation. Different road construction materials can have different emissivity. Under different weather conditions, the same material can also have a different emissivity. Therefore, the temperature interpretation based on constant emissivity assumption is not always valid.

Figure 1:
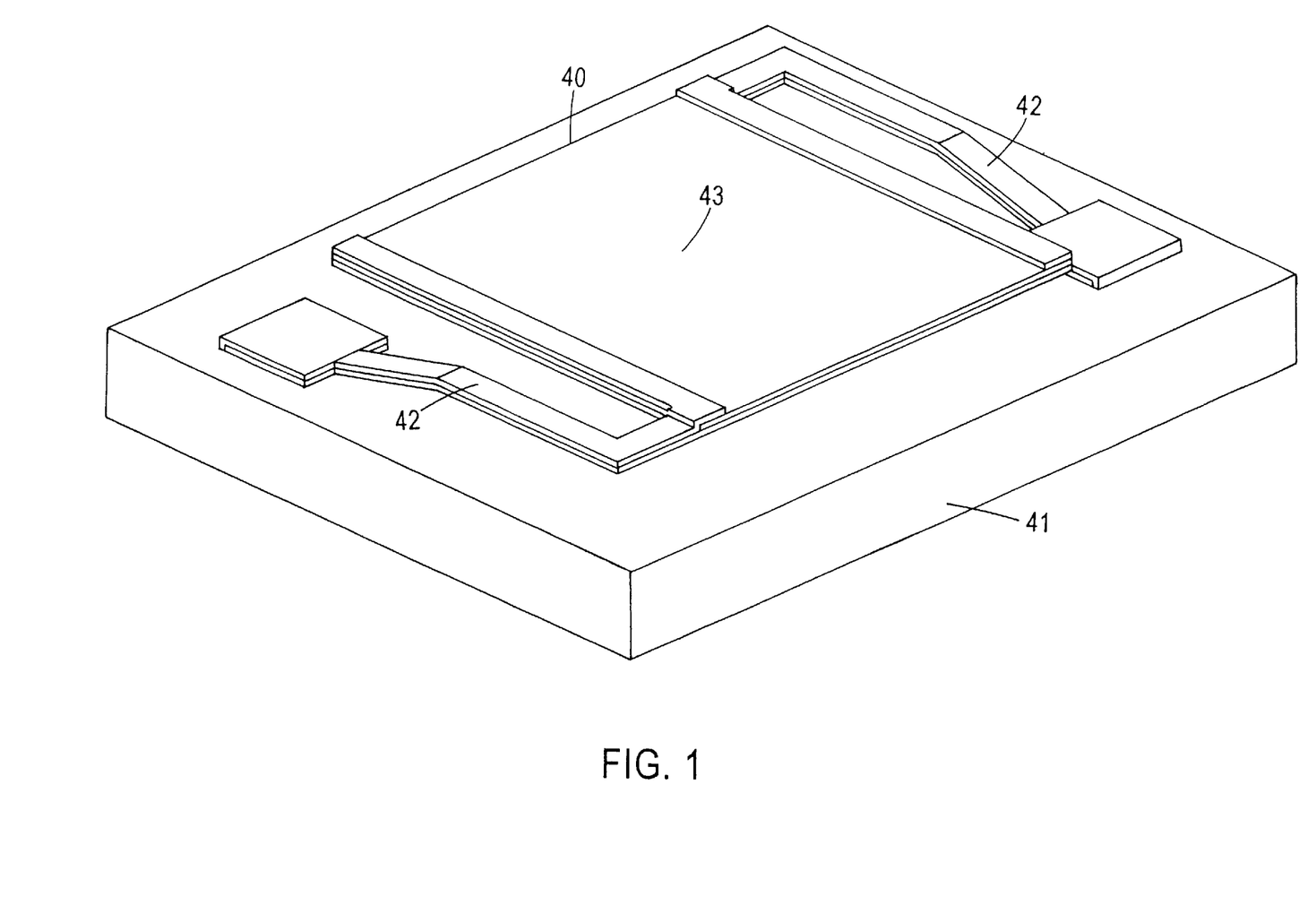
FIG. 1 is a perspective view of a micro-bolometer as known in the prior art.

Micro-bolometric detectors have been developed only recently thanks to advanced micro-machining technology. A micro-bolometer is a suspended structure, either as a raised platform over a substrate through surface micro-machining technique, or a flat platform over a cavity in the substrate through bulk micro-machining technique. FIG. 1, identified as prior art, shows the structure of a typical micro-bolometer 40, consisting of a suspended infrared sensing platform 43 supported by thin, long beams 42, formed on a semiconductor substrate 41. The platform 43 is formed with infrared sensitive materials, for example VO, Amorphous Silicon, Ti nitride, etc. sandwiched between insulating dielectric layers. The resistance of the infrared sensitive material decreases as the temperature of the sensor increases due to the infrared radiation. The thin, long supporting beams greatly reduce the thermal diffusion into the substrate, and thus improve the thermal isolation. Therefore, the thermal sensitivity of a micro-bolometer is high compared with other uncooled thermal infrared detectors. Since micro-bolometers can be integrated with on-chip electronic circuits, the infrared sensing module can be made on a single chip at a low cost. Micro-bolometers are not as susceptible to vibration or shocks as the pyroelectric detectors are.

In the field of systems for detecting potentially icy conditions on roads, reference may be made to the following United States patents:

| U.S. patent | Issue Date | Inventor(s) |
| --- | --- | --- |
| 3,596,264 | Jul. 27, 1971 | Ciemochowski |
| 3,891,979 | Jun. 24, 1975 | Braun |
| 4,222,044 | Sep. 9, 1980 | Boschung |
| 4,492,952 | Jan. 8, 1985 | Miller |
| 5,416,476 | May 16, 1995 | Rendon |
| 5,796,344 | Aug. 18, 1998 | Mann, et al |

SUMMARY OF THE INVENTION

It is an object of the invention to provide a non-contacting temperature sensing device where fast response and accuracy are needed, such as for automotive applications, which reduces the impact of emissivity dependence on the resulting device and which incorporates micro-bolometric detectors as the temperature sensing means.

In accordance with the invention, this object is achieved with a non-contacting temperature sensing device for automotive applications comprising:

a first infrared sensing means for detecting infrared radiation within a first wavelength band and for producing a first signal corresponding to the detected infrared radiation of said first wavelength band;

a second infrared sensing means for detecting infrared radiation within a second wavelength band and for producing a second signal corresponding to the detected infrared radiation of said first wavelength band;

signal processing means for obtaining the ratio of the first and second signals in order to provide a third signal, the third signal being emissivity independent and related to temperature.

Preferably, the device according to the invention, provides a non-contacting temperature sensing device incorporating micro-bolometric detectors as the suitable infrared sensing means in detecting road conditions for automotive applications. Further, the first and second infrared sensing means each include an active infrared sensing element and a temperature drift compensating element. A current bias is applied to the active infrared sensing element as well as to the temperature drift compensating element, which is identical in structure with the active infrared sensing element, and the voltage outputs of these two elements pass through a differential amplifier. The fluctuation in the substrate temperature or the ambient temperature affects the active sensing element and the compensating element in the same way, thus it is cancelled out. Instead of using one spectral band of the infrared radiation, as in the prior art, two spectral bands are used resulting in a first and second signal. The ratio signals are emissivity independent, so that the device of the present invention provides more accurate temperature of the first and second measurements. The need to compensate for window contamination is also eliminated by this two band approach.

The filtering elements for the two bands could be multi-layer thin film filters either coated on flat windows or on diffractive micro-lenses. The use of diffractive micro-lenses further reduces the size of the device, and eliminates the need for a separate optical lens.

BRIEF DESCRIPTION OF THE DRAWINGS

The present invention and its advantages will be more easily understood after reading the following non-restrictive description of a preferred embodiment thereof, made with reference to the following drawings in which.

DESCRIPTION OF A PREFERRED EMBODIMENT OF THE INVENTION

The invention concerns a non-contacting temperature sensing device 10, particularly used for automotive applications, although it will be apparent to those skilled in the art that other applications can be contemplated for the non-contacting temperature sensing device 10 of the invention.

The device 10 includes a first infrared sensing means 20a for detecting radiation within a first wavelength band and for producing a first signal corresponding to the detected infrared radiation of the first wavelength band. The device 10 also includes a second infrared sensing means 20b for detecting radiation within a second wavelength band which is different from the first band and for producing a second signal corresponding to the detected infrared radiation of the second wavelength band. The devices further includes signal processing means 30 for obtaining the ratio of the first and second signals in order to provide a third signal which is emissivity independent and proportional to temperature. The device 10, to that effect, may also include a temperature indicating means 100 for indicating the measured temperature corresponding to the detected infrared radiation. As mentioned in the description of the prior art, the first and second infrared sensing means 20a, 20b are housed in a casing 70 (shown in FIGS. 6a and 6b) and aimed at a road surface (however, in the case where the device according to the invention is used for other purposes, it should be understood that the first and second infrared sensing means 20a, 20b can be aimed at any other object).

In accordance with the invention, the first and second infrared sensing means 20a, 20b preferably each comprise an active infrared detecting element 21a, 21b providing an active signal and a temperature drift compensating element 22a, 22b providing an inactive signal. The difference between the active and inactive signals is amplified, resulting in the first and second signals respectively. Preferably, the active infrared detecting elements 21a, 21b and the temperature drift-compensating elements 22a, 22b are all identical micro-bolometers such as the one illustrated on FIG. 1.

Figure 2:
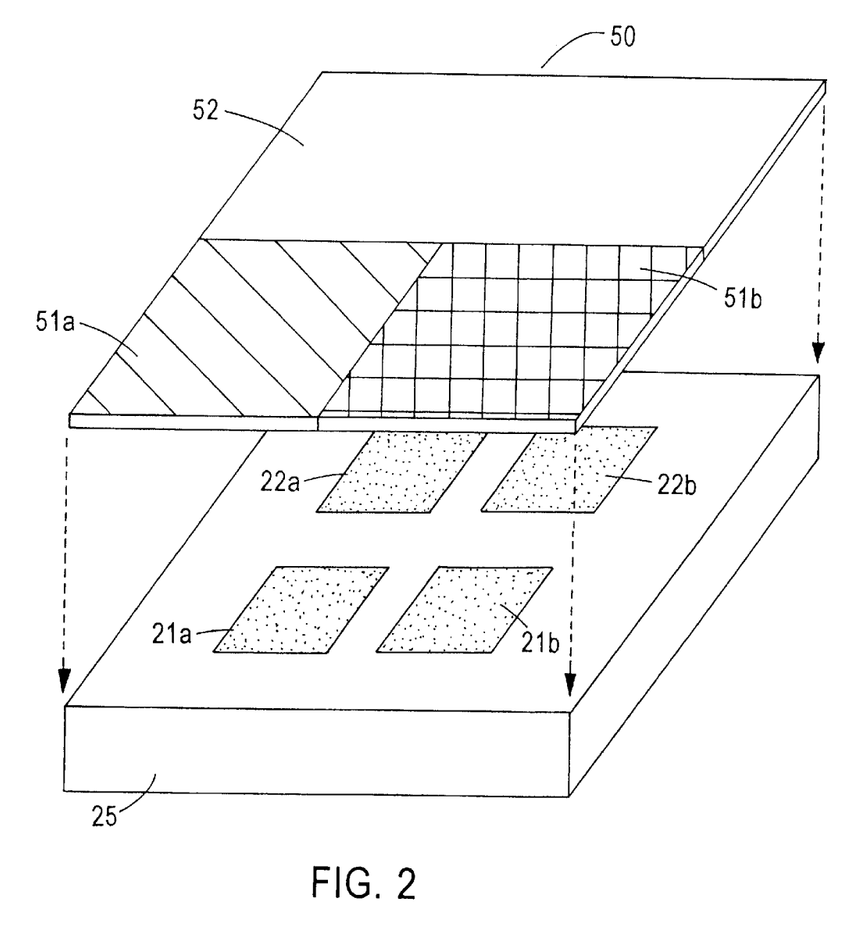
FIG. 2 is a schematic representation of a first and second infrared sensing means for use with the device of the invention.
Figure 3:
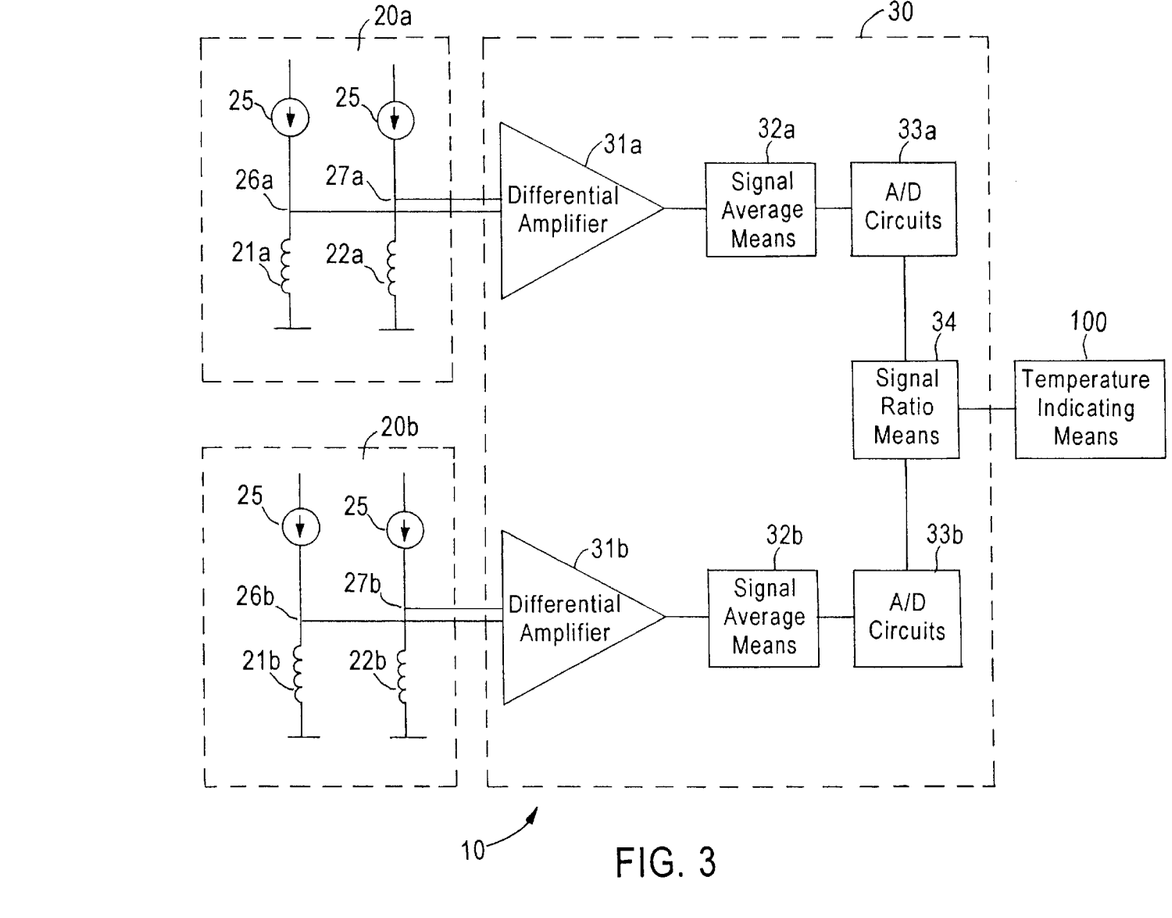
FIG. 3 is a circuit diagram of the interconnection of the first and second infrared sensing means, including associated signal processing means, for DC bias.
Figure 4:
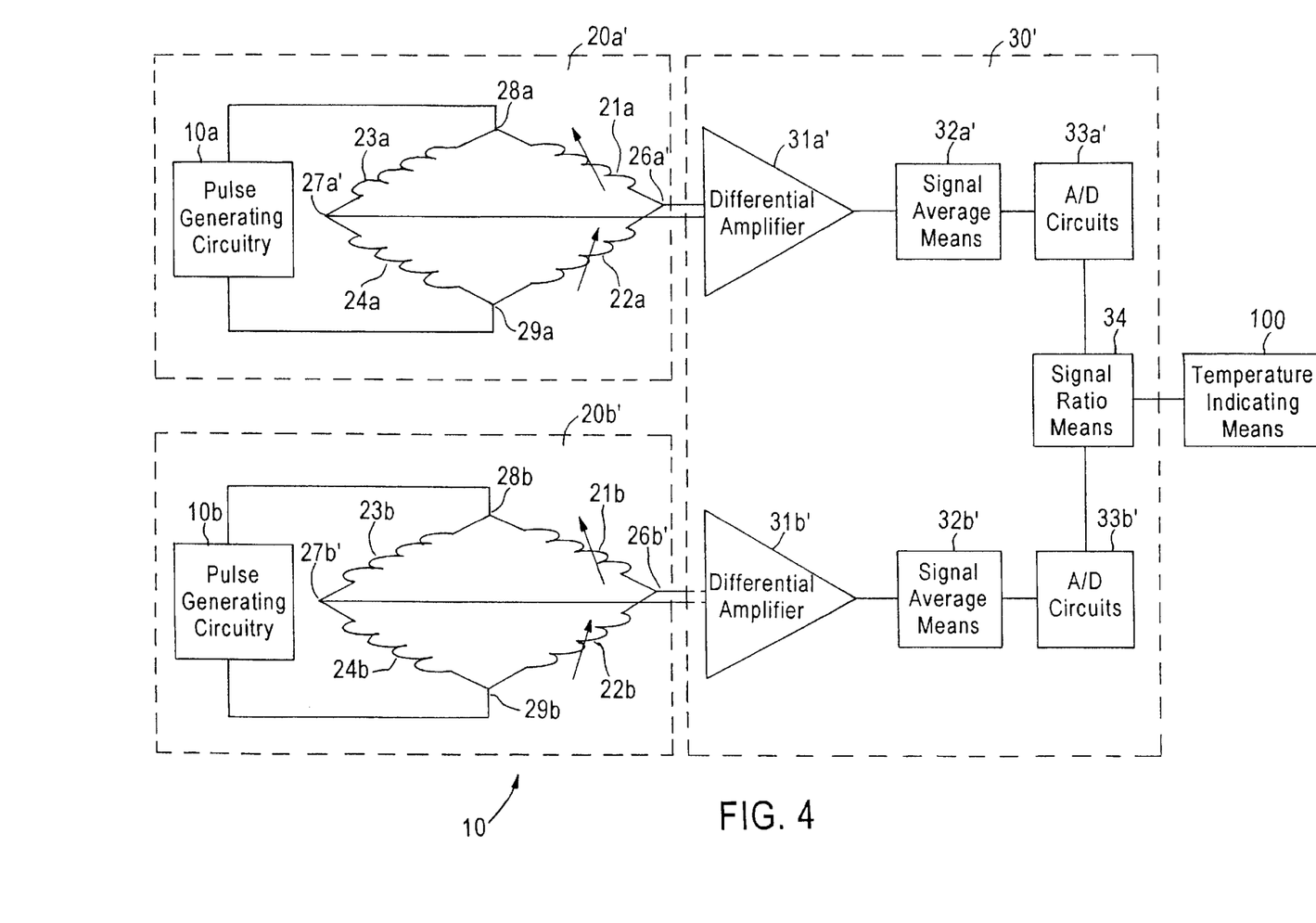
FIG. 4 is a circuit diagram of the interconnection of the first and second infrared sensing means, including associated signal processing means, for pulsed bias.

Referring now to FIGS. 2 to 4, two preferred embodiments of the invention are shown.

As shown in FIG. 2, four identical micro-bolometers 21a, 21b, 22a, 22b are fabricated on substrate 25 as shown. Preferably, the signal processing means 30 are also integrated on the substrate 25. The bolometers 21a, 21b, 22a, 22b can have the same structure as bolometer 40 shown in FIG. 1 or any suitable micro-bolometer structures. As mentioned above, first and second micro-bolometers 21a and 21b are active detecting elements, which are aligned with wavelength selecting means 51a and 51b, respectively. The wavelength selecting means will be further detailed hereinafter. The purpose of wavelength selecting means, which are essentially band pass fitters with different bands, is that the fluctuation in the substrate temperature or the ambient temperature affects the active sensing element and the compensating element in the same way, thus it is cancelled out. Instead of using one spectral band of the infrared radiation, as in the prior art, two spectral bands are used resulting in a first and second signal. The ratio signals are emissivity independent, so that the device of the present invention provides more accurate temperature of the first and second measurements. The need to compensate for window contamination is also eliminated by this two band approach.

Therefore, detector 21a sees infrared radiation from wavelength band 1 and detector 21b sees radiation from band 2. Bolometers 22a and 22b are temperature drift compensating elements, which are aligned with an opaque cover 52, so that they are not exposed to the infrared radiation from the radiating surface viz. the ground surface or roadway. The active detecting element 21a and 21b and the temperature drift compensating element 22a and 22b could be a single large micro-bolometer, or multiple small micro-bolometers connected in series. In the preferred embodiment, they are single micro-bolometric detectors of the size of 150×150 µm. VO$_2$ film of temperature coefficient of resistance (TCR) of −4% is sandwiched between a top and bottom silicon nitride layers which are the insulating dielectric layers. The nominal resistance of one micro-bolometer is 90 kΩ.

Since micro-bolometers are active elements, the device must include power means. In this present case, reference will now be made to biasing schemes and operation conditions. Two types of biasing schemes and operation conditions are preferred, i.e. continuous DC bias or pulsed bias, which are appropriate for different conditions, although it is possible that other biasing schemes are equally applicable to the present invention.

In vacuum operation, i.e. if the casing is under a vacuum, heat transfer through convection is greatly reduced. This results in better sensitivity but also increases bolometer self-heating. In this case, pulsed bias is desirable since the pulse height and width can be adjusted so that the detectors can have maximum responsivity without inducing self-heating.

On the other hand, in normal air operation, the extent of self-heating is reduced. DC bias thus becomes more effective because small noise bandwidth can be achieved through passive filtering, and more frequent sampling is possible. The device 10 of the invention can alternatively be sealed in a package filled with a low thermal conductivity inert gas to increase thermal insulation and reduce moisture build-up. This inert gas can be Xe, for example, which has four times less thermal conductivity than normal air. In this case, the selection of biasing schemes should take in account many interrelated factors including the choice of inert gas, the pressure in the package and the bolometer resistance. Current bias or voltage bias is equally possible depending on specific bolometer and read-out designs.

FIG. 3 shows one embodiment of the first and second infrared sensing means and the signal processing means 30 for continuous DC bias. As mentioned above, infrared sensing means 20a and 20b are wavelength for band 1 and band 2 respectively. The infrared sensing means 20a and 20b comprises the active sensing micro-bolometer 21a and 21b, and the temperature drift compensating micro-bolometer 22a and 22b. An integrated low noise current source 25 provides current bias for all bolometric detectors. The infrared sensing means 20a and 20b can also include on-chip or off-chip capacitors (not shown) for passive filtering to reduce the noise bandwidth. The voltage output of micro-bolometers 21a and 21b at nodes 26a and 26b and the voltage output of micro-bolometers 22a and 22b at nodes 27a and 27b are connected to the inputs of a differential amplifiers 31a and 31b.

Under dark condition, all of the bolometers i.e. the active sensing bolometers 21a and 21b and temperature drift compensating bolometers 22a and 22b are exposed to no infrared radiation., Therefore, the voltage difference between nodes 26a and 27a and 26b and 27b is ideally 0. When the active sensing bolometers 21a and 21b are exposed to the infrared radiation from the radiating surface, their resistance will decrease due to the heating caused by the impinging of the infrared radiation. A small voltage difference proportional to the received infrared energy is induced across nodes 26a and 27a and 26b and 27b. The voltage difference across nodes 26a and 27a corresponds to the signal from band 1 and the voltage difference across nodes 26b and 27b corresponds to the signal from band 2. The amplified signals are then preferably sampled and averaged by the signal average means 32a and 32b before being converted to a digital signal by the A/D converting circuits 33a and 33b. The averaging of the multi-samples of the signals is that noise is reduced and sensitivity increased. The digitised signal from band 1 is divided by the signal from band 2 by the signal ratio means 34. The emissivity factor is cancelled out by this division since both active micro-bolometers 21a and 21b are equally affected by a change in emissivity. Thus the resultant ratio varies only in proportion to changes in surface temperature and can be correlated with specific temperatures of the radiating surface independent of the emissivity. Accordingly, the output of signal ratio means 34 is connected to a temperature indicating means 100 which may be calibrated to display numerical values of temperature corresponding to the received signal ratio.

FIG. 4 shows another embodiment of the device under pulsed bias conditions. Active sensing bolometers 21a and 21b are connected with their counterparts temperature drift compensating bolometers 22a and 22b in series to form one arm of the Wheatstone bridge. The other arm of the Wheatstone bridge is formed by connecting in series two stationary resistors 23a, 24a and 23b and 24b, which are identical in structure and in resistance values. The magnitude of the value of resistance 23a, 24a and 23b, 24b is set in conformity with the magnitude of resistance of the micro-bolometers which, as mentioned previously, is in the order of 90 kΩ. The stationary resistors 23a, 24a, 23b, 24b are fabricated on the same substrate as the electronic circuits and connected with the micro-bolometers 21a, 22a, 21b, 22b to form the Wheatstone bridges as shown in FIG. 4.

A pulsating voltage generated by pulse generating circuits 10a, 10b is applied across nodes 28a, 29a and 28b, 29b to provide bias to the bolometers 21a, 22a, 21b, 22b. The first and second signals are taken from the voltage difference between nodes 26a', 27a' and 26b' and 27b'. Under dark condition, the Wheatstone bridge is in perfect balance. Therefore, the voltage difference between nodes 26a ' and 27a' and 26b' and 27b' is ideally 0. When the active sensing bolometers 21a and 21b are exposed to the infrared radiation from a radiating surface, their resistance will decrease due to the heating caused by the impinging of the infrared radiation. A small voltage difference proportional to the received infrared energy is induced across nodes 26a', 27a', 26b' and 27b'. The resulting signals are then amplified by the subsequent differential amplifiers 31a' and 31b' resulting in the first and second signals, respectively. The amplified signals from multiple pulses are then averaged by the average means 32a', 32b' before being converted to a digital signal by the A/D converting circuits 33a', 33b'. As for DC bias, the averaging of signals from multiple pulses for one temperature measurement further reduces noise and increases sensitivity.

The performance of the bolometers in the preferred embodiment as shown in FIG. 2 and FIG. 3 is simulated. The estimated noise equivalent temperature differential (NETD) in vacuum and in air is listed in Table I for two selected wavelength bands, assuming f/2 optics, 720 pF passive filtering, current bias of 15 µA, and 75-sample averaging in 0.1s.

TABLE I

| Band | NETD (K) | | | |
|---|---|---|---|---|
| | 8.5–10.5 | | 11.5–13.5 | |
| Scene Temp | air | Vacuum | air | Vacuum |
| 233K | 0.621 | 0.036 | 0.648 | 0.038 |
| 300K | 0.250 | 0.014 | 0.343 | 0.020 |

An important consideration is the selection of the bands for the active infrared detector. The criteria for band selection are: the bands should be wide enough for sufficient irradiation energy to reach the bolometers; they should be close enough so that the emissivity will not vary a great deal; the ratio of signals between the two bands should vary monotonously with the surface temperatures and more preferably with a large slope.

In the preferred embodiment, the bands of 8.5–10.5 $\mu$m and 11.5–13.5 $\mu$m wavelength are selected. Radiometric calculation based on Planck's blackbody law showed that energy ratio between these two bands increases almost linearly with a slope of 0.005/° C. Other band selections are also possible. The band selection is implemented by the wavelength selecting means.

In a preferred embodiment, the device 10 according to the invention is provided with a window cover. The window cover 50 as shown in FIG. 2 consists of the band-pass filtering elements 51a, 51b and opaque cover 52, which can all be multi-layer thin-film coated. Filter 51a has high transmission in the wavelength range of 8.5–10.5 $\mu$m and low transmission outside that range, while filter 51b has high transmission in the wavelength range of 11.5–13.5 $\mu$m and low transmission elsewhere. Opaque cover 52 has low transmission within the whole infrared radiation spectrum. Filters 51a, 51b and cover 52 are preferably made of the same material so that they will have similar background irradiation characteristics. They can be made from a single piece of Ge or ZnSe substrate, for example, differently coated in different areas. Alternatively, three pieces of the same material are thin film coated separately and then glued together to form a complete window cover 50. They are then aligned with respective detectors on the substrate and assembled together in a metal casing 70 (shown schematically in FIG. 6). The opaque cover 52 can also be a part of the metal casing that emissive characteristics similar to those of filters 51a and 51b.

A focusing lens 80 for focusing the infrared radiation onto the micro-bolometers increases the radiation flux reaching the detector, and thus improves the sensitivity of the device. A lens of f/2 can be used, for example. It can be made of Ge or polyethylene.

Figure 5A:
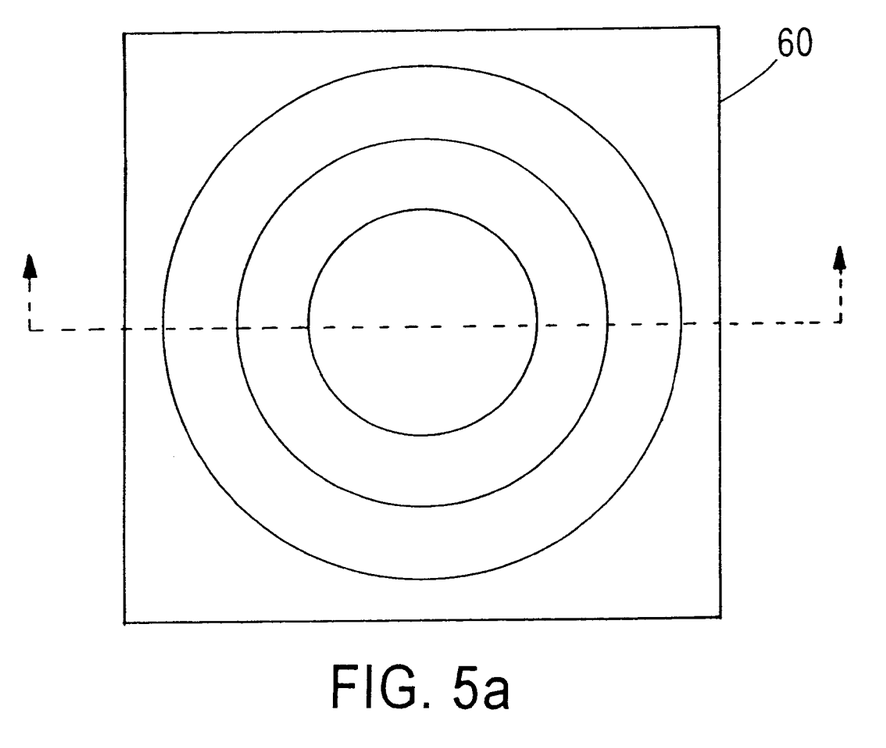
FIGS. 5a and 5b are top plan and cross-sectional views respectively of a casing according to a preferred embodiment of the invention.
Figure 5B:
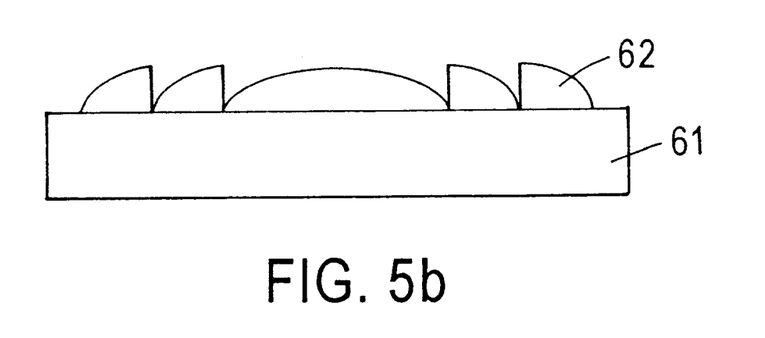

In another embodiment, the band-pass filtering elements 51a and 51b can be diffractive microlenses. Diffractive microlenses are made of concentric surface relief structure etched in a suitable substrate, for example, Ge or Si. FIGS. 5a and 5b show top view and cross-sectional views respectively of a typical diffractive microlens 60. The relief pattern 62 is etched into the substrate 61 by photolithography and dry etching. Since the microlenses are fabricated on one substrate with the same precision as the micro-bolometers, they can be aligned perfectly with corresponding active infrared sensing elements 21a, 21b. The diffractive microlenses can be designed to serve as focusing elements as well as filtering elements, because their focal point is wavelength selective. Only infrared radiation within a certain wavelength range is focused resulting in high power density within that wavelength band. Outside that band, the incident energy is not focused and so the power density is low. Normally this low out-of-band power density should not be of concern. Nevertheless, the multi-layer thin film coating can still be applied to the microlenses to further improve the filtering property. By using the microlenses, a separate focusing lens 80 is not required, resulting in a reduced device size and cost.

Figure 6A:
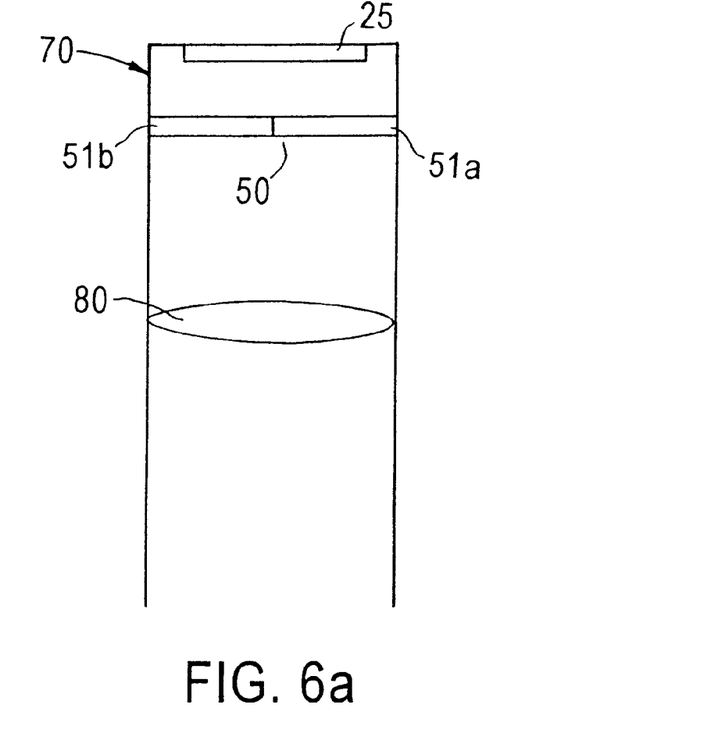
FIG. 6a is a cross-sectional view of a device according a preferred embodiment of the invention.
Figure 6B:
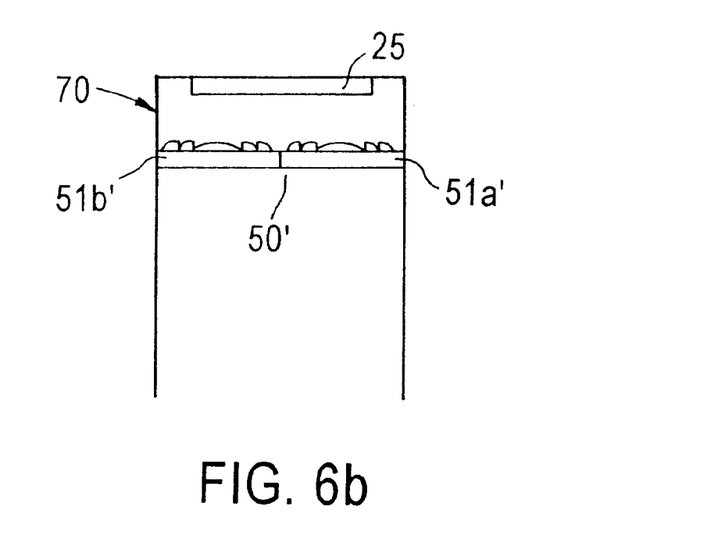
FIG. 6b is a cross-sectional view of a device according to another preferred embodiment of the invention.

FIG. 6a and FIG. 6b schematically show the device 10 of the invention, including a metal casing 70 with the window cover 50 and lens 80. In FIG. 6a, the substrate 25, with all the fabricated infrared sensing means and processing electronics, is bonded to the metal casing 70. The window cover 50 is housed in the metal casing, in front of the substrate. Window cover 50 consists of the filtering elements 51a and 51b on a flat substrate. A focusing lens 80 of f/#2 is assembled in front of the window cover. It can be adjusted so that the infrared radiation from the radiating surface can be focused onto the active sensing elements. FIG. 6b shows the alternative embodiment where a diffractive microlenses as the focusing and/or filtering elements is used. The window cover 50' consists of at least two microlenses 51a' and 51b' corresponding to the selected two bands. The incident infrared radiation is filtered and focused by 51a' and 51b' onto respective active sensing detectors on substrate 25.

The effects of the substrate temperature drift and background irradiation are compensated by the temperature drift compensating elements as mentioned above. Since the temperature drift compensating elements 22a and 22b are identical to the active sensing elements 21a and 21b, the substrate temperature drift affects 21a and 21b the same way as it affects 22a and 22b. Thus the relative resistance difference between 21a, 22a and 21b and 22b is not affected even if there is substrate temperature drift. The background radiation is usually weak since it is not focused onto the detectors. In a worst case scenario where this background radiation is significant with respect to the signals, the active sensing elements 21a and 21b will receive as much background radiation as the compensating elements 22a and 22b since windows 51a, 51b and 52 are either formed on one piece of material or made of the same material. By the same token as in the substrate temperature drift situation, this effect will be cancelled out at the output of the differential amplifier 31a, 31b or 31a', 31b' depending on the biasing scheme used.

The device 10, in order to function properly, must of course be properly calibrated. Two-point calibration is necessary for the active detectors in order to obtain the gain and offset value of individual detectors. The calibration procedure can be described as follows. The bolometer signal is measured at two different blackbody temperatures corresponding to incident power of $P_1$ and $P_2$. From these two measurements, detector gain and offset $\alpha$ and $\beta$ can be obtained and compensation for the offset $\beta$ can be applied to the signal. Table II gives a mathematical representation of the situation.

TABLE II

| | $P_1$ | $P_2$ |
|---|---|---|
| Uncorrected signal | $V_1 = \alpha P_1 + \beta$ | $V_2 = \alpha P_2 + \beta$ |
| Corrected signal | $V_1^c = V_1 - \beta = \alpha P_1$ | $V_2^c = V_2 - \beta = \alpha P_2$ |

In general, the ratio of detector signals from two bands can be written, after correction, as $$\frac{V_{B1}^C}{V_{B2}^C} = \frac{V_{B1} - \beta_{B1}}{V_{B2} - \beta_{B2}} = \frac{\alpha_{B1}}{\alpha_{B2}} \frac{\varepsilon_{B1}}{\varepsilon_{B2}} \frac{P_{B1}^{BB}}{P_{B2}^{BB}}$$

where $\epsilon$ is the road surface emissivity and $P^{BB}$ is the power emitted by a black body. If the bands are selected such that $\epsilon_{B1} = \epsilon_{B2}$, then by knowing $\alpha$ and $\beta$, $$\frac{P_{B1}^{BB}}{P_{B2}^{BB}} = \frac{\alpha_{B2}}{\alpha_{B1}} \frac{V_{B1}^C}{V_{B2}^C}$$

through the calibration, the true temperature of the road can be deduced by comparing $P_{B1}^{BB}/P_{B2}^{BB}$ with the ratio vs. temperature curve of an ideal blackbody.

An alternative approach to calibration is that the signal ratio $V_{B1}/V_{B2}$ is calibrated using a blackbody source for all the temperature points within the temperature range of interest (for example, −40 to 100° C.), and a look-up table is generated. The true temperature of the road can be derived by comparing the uncorrected ratio with the look-up table. This approach is straightforward, but the calibration procedure requires more elaborate work.

It would be desirable that the non-contacting temperate measurement device be calibrated only once. However, it is difficult to guarantee that no drift would occur with time. The two-point calibration approach makes it easy for periodical re-calibration by a user. An offset update can be performed by using a surface at ambient temperature or the surface of a block of ice as the reference temperature.

Theoretically, two active detectors and two reference detectors would be enough to perform the temperature measurement. However, in case of detector failure, it would be highly desirable that the complete system does not break down. Redundancy of the IR detectors could be implemented to avoid this problem. For example, five active and five referencing micro-bolometers could be used for each spectral band. That would render twenty active detectors. The system could automatically switch between detector pairs used for road temperature measurement if a micro-bolometer failure is detected. Factory calibration of these twenty detectors are as easy as for just 1. Or the twenty detector pairs could be read continuously and the valid temperature measurement be averaged (measurements from dead detectors would be discarded). It is interesting to note that this measure could be taken with almost no additional fabrication cost since the die size would probably be the same for 4 detectors or for 20 detectors.

One of the drawbacks of the prior art systems is that little consideration was given to window contamination. Due to typical outdoor conditions, the external window or lens will be subjected to dust, water, ice, mud, etc. The present invention using two wavelength bands is much less sensitive to the contamination on the window than the prior art, where one-band method is used. On one hand, the window contamination attenuates the infrared radiation reaching the micro-bolometers the same way for both bands, i.e., the ratio of the two bands won't be affected. On the other hand, the window contamination adds to the background radiation the same way for both the active sensing elements and the temperature drift compensating elements. By using the temperature drift compensating scheme, the fluctuation in the background radiation will not affect the measurement accuracy.

While the primary application for this device is for measuring the temperature of the road surface from an automobile, it can also be used to measure the temperature of any part of the vehicle. For example, the thermal image of a rotating tire surface can be focused onto this device and the tire temperature be measured. Due to the emissivity independent nature of this invention, the emissivity of the tire material is not required.

From the foregoing it will be obvious to those skilled in the art that many modifications, other than those already described and discussed herein, may be made without departing from the spirit of the invention, as defined in the appended claims. It is to be understood, therefore, that all matter shown and described is to be interpreted as illustrative and not in a limiting sense.

What is claimed is:

1. A non-contacting temperature sensing device for use with a vehicle, comprising:

a first infrared sensing means for detecting infrared radiation within a first wavelength band and for producing a first signal corresponding to said detected infrared radiation of said first wavelength band;

said first infrared sensing means comprising an active infrared detecting element providing an active signal and a first temperature drift compensating element providing an inactive signal and said first signal corresponding to an amplified difference between said active signal and said inactive signal;

a second infrared sensing means for detecting infrared radiation within a second wavelength band and for producing a second signal corresponding to said detected infrared radiation of said second wavelength band;

said second infrared sensing means comprising an active infrared detecting element providing an active signal and a second temperature drift compensating element providing an inactive signal and said second signal corresponding to an amplified difference between said active signal and said inactive signal power means for powering said first and second infrared sensing means; and signal processing means for obtaining the ratio of the first and second signal in order to provide a third signal, said third signal being emissivity independent and proportional to a temperature.

2. A non-contacting temperature sensing device according to claim 1 wherein:

said device further includes a first wavelength selecting means aligned with said first infrared sensing means and a second wavelength selecting means aligned with said second infrared sensing means, and wherein said first and second wavelength selecting means allow passage of a first and second wavelength respectively, said first and second wavelength being suitably close to one another in the spectrum to represent an emissivity ratio substantially equal to one.

3. A non-contacting temperature sensing device according to claim 2, wherein said first and second temperature drift compensating elements are aligned with an infrared radiation opaque window.

4. A non-contacting temperature sensing device according to claim 3, wherein said active infrared detecting elements of said first and second infrared sensing means are micro-bolometers.

5. A non-contacting temperature sensing device according to claim 4, wherein said temperature drift compensating elements are micro-bolometers identical to said micro-bolometers of said first and second infrared sensing means.

6. A non-contacting temperature sensing device according to claim 3, wherein said first and second infrared sensing means and said temperature drift compensating elements each comprise a plurality of identical micro-bolometers connected in series, respectively.

7. A non-contacting temperature sensing device according to claim 3, wherein said opaque window has an emissive characteristic substantially equal to an emissive characteristic of said first and second wavelength selecting means respectively.

8. A non-contacting temperature sensing device according to claim 2, wherein said first and second wavelength selecting means are multi-layer thin dielectric film band-pass filters.

9. A non-contacting temperature sensing device according to claim 2, wherein said first and second wavelength selecting means are diffractive microlenses.

10. A non-contacting temperature sensing device according to claim 1, wherein said power means include bias generating circuitry integrated with said infrared sensing means, and wherein said bias generating circuitry can generate continuous bias or pulsed bias.

11. A non-contacting temperature sensing device according to claim 1, wherein said first and second infrared sensing means are housed in a casing and can operate in vacuum, in air or in an inert gas environment.

12. A non-contacting temperature sensing device according to claim 1, wherein said signal processing means comprises signal amplifier means, signal averaging means, analog to digital conversion means and signal ratio means, said signal processing means being integrated on a same chip as said first and second infrared sensing means.

13. A non-contacting temperature sensing device according to claim 1, wherein said device includes a temperature indicating means operatively connected to said signal ratio means for receiving the ratio output signal therefrom and displaying a corresponding temperature of a radiating object.

* * * * *